United States Patent
Kim et al.

(10) Patent No.: US 8,525,869 B2
(45) Date of Patent: Sep. 3, 2013

(54) METHOD FOR VIDEO TELEPHONY COMMUNICATION AND A TERMINAL USING THE SAME

(75) Inventors: Soon Jin Kim, Daegu (KR); Jae Min Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1331 days.

(21) Appl. No.: 12/129,621

(22) Filed: May 29, 2008

(65) Prior Publication Data
US 2009/0009589 A1  Jan. 8, 2009

(30) Foreign Application Priority Data
Jul. 3, 2007  (KR) .................. 10-2007-0066657

(51) Int. Cl.
*H04N 7/14* (2006.01)
(52) U.S. Cl.
USPC ........................................................ 348/14.08
(58) Field of Classification Search
USPC .............. 348/14.01–14.09; 455/343.3–343.5
See application file for complete search history.

(56) References Cited

U.S. PATENT DOCUMENTS

| | | | |
|---|---|---|---|
| 6,687,515 B1 * | 2/2004 | Kosaka | 455/566 |
| 7,062,250 B1 * | 6/2006 | Kosaka | 455/343.5 |
| 7,085,538 B2 * | 8/2006 | Motohashi | 455/67.11 |
| 2008/0057894 A1 * | 3/2008 | Aleksic et al. | 455/187.1 |

* cited by examiner

*Primary Examiner* — Curtis Kuntz
*Assistant Examiner* — Sunita Joshi
(74) *Attorney, Agent, or Firm* — Jefferson IP Law, LLP

(57) ABSTRACT

A terminal and a method for video telephony communication using the terminal are provided. The method for video telephony communication includes executing video telephony communication for transmitting and receiving a video signal and a voice signal, determining a power saving mode set in the terminal, measuring at least one environmental value corresponding to the determined power saving mode, and transmitting and receiving the voice signal when the environmental value is less than a critical value. The terminal and the method for video telephony communication enable a reduction of power consumption even in a poor video telephony communication environment.

12 Claims, 5 Drawing Sheets

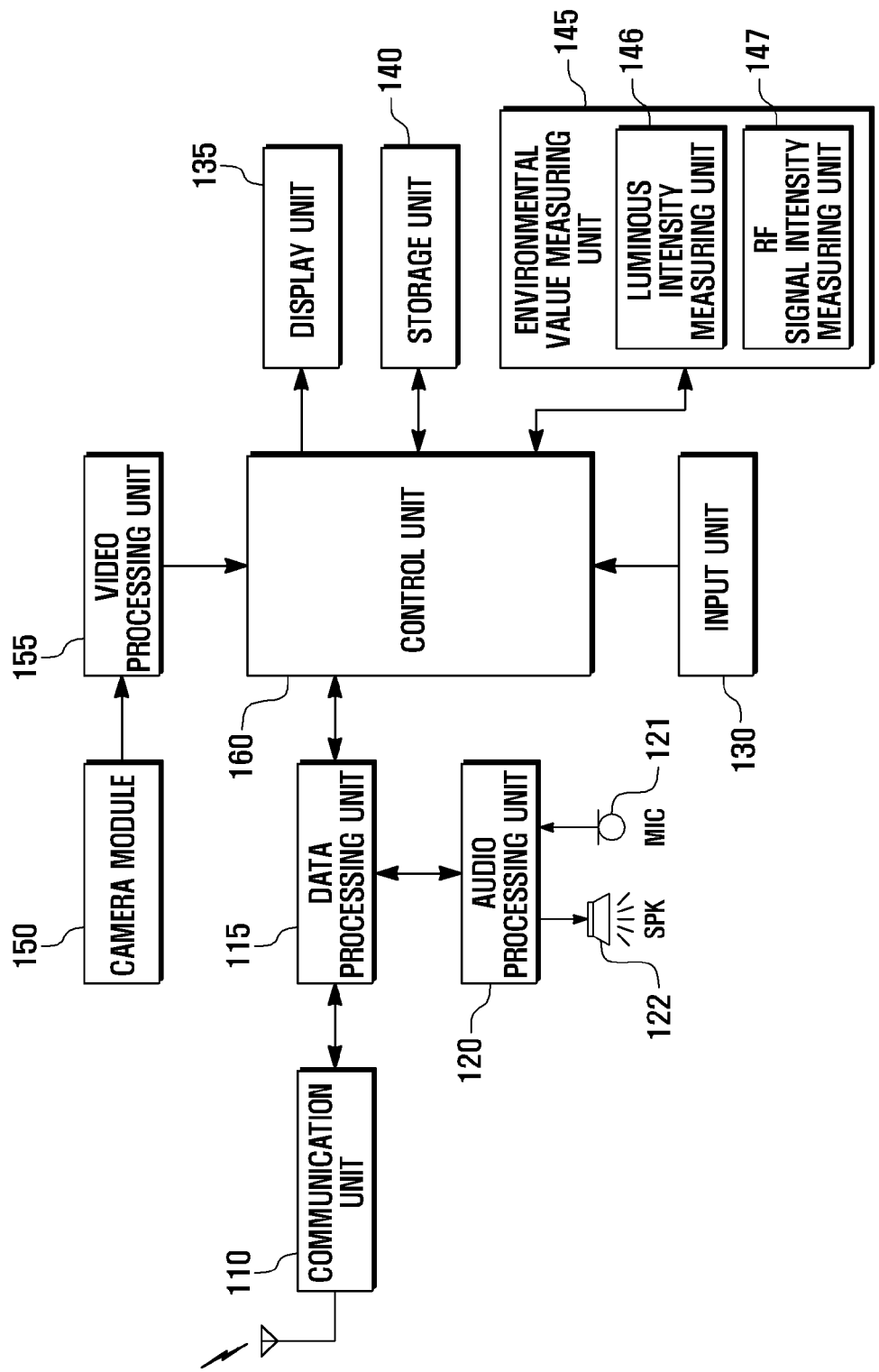

METHOD FOR VIDEO TELEPHONY COMMUNICATION AND A TERMINAL USING THE SAME

PRIORITY

This application claims the benefit under 35 U.S.C. §119 (a) of a Korean patent application filed in the Korean Intellectual Property Office on Jul. 3, 2007 and assigned Serial No. 2007-0066657, the entire disclosure of which is hereby incorporated by reference.

BACKGROUND OF THE INVENTION

1. Field of the Invention

The present invention relates to a method for video telephony communication a terminal using the same. More particularly the present invention relates to a terminal which enables a reduction of power consumption during video telephony communication and a method for video telephony communication using the same.

2. Description of the Related Art

Due to the development of technologies for manufacturing terminals, various functions, such as video telephony communication as well as voice communication, are being employed in terminals.

However, according to conventional video telephony communication, the intensity of a transmitted video signal is occasionally increased to increase the transmission rate of radio waves in a shadow area where the reception rate of radio waves is poor.

However, in a shadow area, even when the intensity of a video signal is increased, breaking of images, noises, block artifacts, or the like may occur, making it difficult to perform normal video telephony communication. Accordingly, batteries may be drained at a more rapid pace due to increase in power consumption. Furthermore, according to conventional video telephony communication, when images are photographed in an environment that is poorly illuminated, dark images are transferred to a counterpart terminal. However, since the counterpart terminal receives the dark images, it is difficult to recognize the image and electric power is unnecessarily consumed.

SUMMARY OF THE INVENTION

An aspect of the present invention has is to address at least the above-mentioned problems and/or disadvantages and to provide at least the advantages described below. Accordingly, an aspect of the present invention is to provide a method for reducing unnecessary power consumption that may occur in a poor video telephony communication environment.

Another aspect of the present invention is to provide a method for reducing unnecessary power consumption by stopping video telephony communication and performing only voice communication in an environment where the luminous intensity and the reception rate of radio waves is poor during video telephony communication.

In accordance with an exemplary embodiment of the present invention, a method for video telephony communication using a terminal in which a power saving mode is set is provided. The method includes executing video telephony communication for transmitting and receiving video signals and voice signals, determining a power saving mode set in the terminal, measuring at least one environmental value corresponding to the determined power saving mode, and transmitting and receiving the voice signals when the at least one environmental value is less than a critical value.

In accordance with another exemplary embodiment of the present invention, a terminal is provided. The terminal includes a communication unit for transmitting and receiving voice signals and video signals, the voice signals and video signals being communicated to and from a counterpart terminal, a camera module for capturing images for the video signal to be communicated to the counterpart terminal, a display unit for displaying at least one of the video signal received from the counterpart terminal and the video signal to be communicated to the counterpart terminal, an environmental value measuring unit measuring at least one environmental value; and a control unit for transmitting and receiving the voice signals when the at least one environmental value measured by the environmental value measuring unit is less than a critical value.

An terminal according to an exemplary embodiments of the present invention include all devices that enable wireless video telephony communication, such as a mobile communication terminal, a mobile phone, a personal digital assistant (PDA), a smart phone, a digital multimedia broadcasting (DMB) phone, a media player, an audio device, a portable television, a digital camera, a laptop computer, a computer, and the like, and may be applicable to an application for them.

In exemplary embodiments of the present invention, video telephony communication refers to the transmission and reception of video signals and voice signals to and from a counterpart terminal.

Video signals transmitted to a counterpart terminal are generated by capturing images, such as a user's face, using a camera module. Further, voice signals are input through a microphone from a user. Video signals and voice signals received from a counterpart terminal are received through a communication unit during video telephony communication. Video signals received from a counterpart terminal are processed in a terminal and are displayed on a display, and voice signals received from the counterpart terminal are processed as audio signals and are output through a speaker.

According to exemplary embodiments of the present invention, when video telephony communication is performed in an environment of low luminous intensity and a weak electric field, the video telephony communication is stopped and only voice signals are transmitted and received.

Transmission and reception of voice signals are implemented by stopping a currently executed video telephony communication mode and switching the video telephony communication mode into a voice communication mode. In this case, although different public wireless networks are used for the video telephony communication and the voice communication, technologies related to compatibility of communication networks will not be described because they are well known in the art.

Video telephony communication includes the transmission and reception of voice signals, which is implemented by stopping transmission of video signals to a counterpart terminal. When transmission and reception of only voice signals are allowed in an environment of low luminous intensity and weak electric field, it is preferable to reduce power consumption by cutting off the power of a camera module and a display. Furthermore, in an environment of low luminous intensity, it is preferable to transmit a preset substitutive video file (multimedia data such as a still image or a moving image) instead of video signals generated through a camera module.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1 is a schematic block diagram illustrating a terminal according to an exemplary embodiment of the present invention;

Throughout the drawings, like reference numerals will be understood to refer to like parts, components and structures.

DETAILED DESCRIPTION OF EXEMPLARY EMBODIMENTS

Figure 2A:
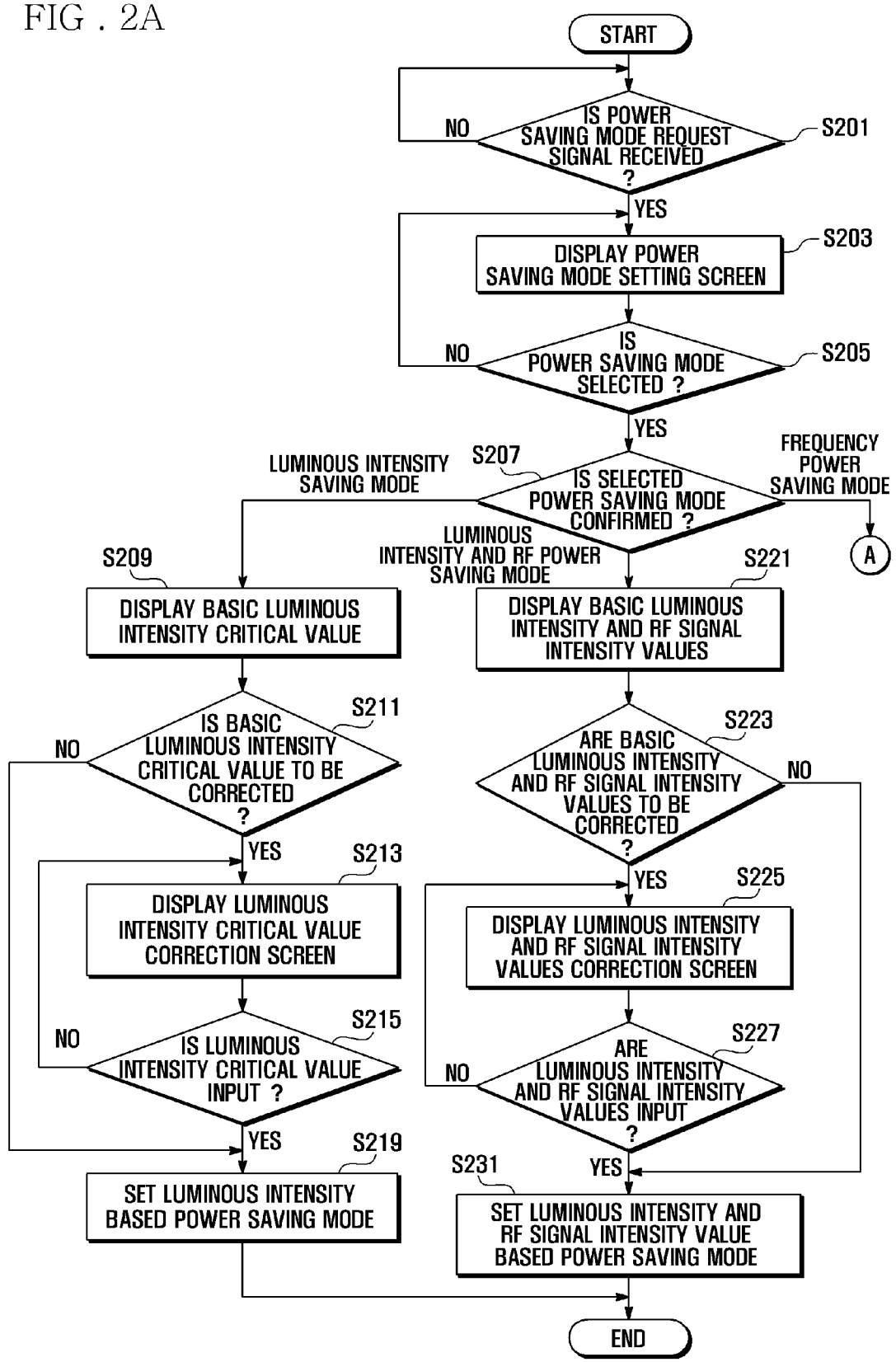
FIGS. 2A and 2B are flowcharts illustrating a method of setting a power saving mode in a method for video telephony communication using a terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

FIG. 1 is a schematic block diagram illustrating a terminal according to an exemplary embodiment of the present invention. Referring to FIG. 1, the terminal includes a communication unit 110, a data processing unit 115, an audio processing unit 120, an input unit 130, a display unit 135, a storage unit 140, an environmental value measuring unit 145, a camera module 150, a video processing unit 155, and a control unit 160.

The communication unit 110 includes a radio frequency (RF) transmitter for up-converting frequencies of a transmitted signal and for amplifying it, and an RF receiver for low noise amplifying a received signal and for down-converting its frequencies. The communication unit 110 performs a wireless video telephony communication function of the terminal. The video telephony communication function includes the communication of an audio signal and a video signal to and from a counterpart terminal.

The data processing unit 115 includes a transmitter for coding and modulating a transmitted signal and a receiver for decoding and demodulating a received signal. That is, the data processing unit 115 may include a modem and a codec. The codec includes a data codec for processing packet data and an audio codec for processing an audio signal such as a voice. Therefore, the data processing unit 115 performs a decoding of a video signal and an audio signal that are received from a counterpart terminal by using the codec.

The audio processing unit 120 performs a reproduction of an audio signal output from the audio codec of the data processing unit 115 through a speaker 122, and/or a transmission of an audio signal generated from a microphone 121 to the audio codec of the data processing unit 115.

The input unit 130 may include a keypad, a touch screen, or a touch pad. The input unit 130 transmits a signal input from a user to the control unit 160 in order to control the operation of the terminal.

The display unit 135 may be a liquid crystal display (LCD), and displays various display data generated in the terminal and a current operational state of the terminal on a screen thereof. When the display unit 135 is realized by a touch screen, it may be operated as the input unit 130. In particularly, the display unit 135 of an exemplary embodiment of the present invention displays a video signal output from the video processing unit 155 on the screen.

The storage unit 140 stores programs and data that are used for the overall operation of the terminal according to an exemplary embodiment of the present invention. More particularly, the storage unit 140 stores critical values for all kinds of environmental values for enabling the control unit 160 to control the operation of the terminal when the environment is changed during video telephony communication. In a low luminous intensity state, the memory unit 140 stores a substitutive video file (multimedia data, such as a still image or a moving image) that is to be transmitted instead of a video signal generated through the camera module 150.

The environmental value measuring unit 145 measures an environmental value of a current terminal under the control of the control unit 160. For this purpose, it is preferable that the environmental value measuring unit 145 include a luminous intensity measuring unit 146 and an RF signal intensity measuring unit 147.

The luminous intensity measuring unit 146 detects the brightness of a video signal output from the camera module 150, digitizes it, and transmits the digitized values to the control unit 160.

The RF signal intensity measuring unit 147 measures the intensity of an RF signal received from the communication unit 110, and transmits it to the control unit 160.

Although environmental values are limited to both the luminous intensity and the intensity of a received RF signal for the sake of convenience in the description of certain exemplary embodiments of the present invention, the environmental values according to other exemplary embodiments of the present invention include all factors that may have influence upon the deterioration of the quality of a video telephony communication, and are thus not limited to what is described.

The camera module 150 enables photographing of an image, and includes a camera sensor for converting a photographic optical signal into an electrical signal, and a signal processor for converting the electrical signal of a photographed analog image from the camera sensor into a digital signal. A charge coupled device (CCD) sensor is conventionally employed as the camera sensor, and the signal processor is realized by a digital signal processor (DSP). The camera module 150 obtains images by photographing a subject. The camera module 150 transmits a video signal converted into an electrical signal to the video processing unit 155.

The video processing unit 155 generates a video frame for displaying video output from the camera module 150. The video processing unit 155 processes the video output from the camera module 150 in units of frames, and outputs the video frames according to the characteristics and size of the display unit 135. Further, the video processing unit 155 has a video codec, and compresses the video frame displayed on the display unit 135 in a preset manner or restores a compressed video frame into an original video frame. The video codec may include one or more of a JPEG codec, an MPEG4 codec, a Wavelet codec and the like.

The control unit 160 controls the overall operation of the terminal.

More particularly, when environmental values (for example, the peripheral brightness, the reception rate of frequencies, etc.) are less than critical values stored in the storage unit 140, the control unit 160 cuts off power supplied to the camera module 150 and performs only voice communication. For this purpose, the control unit 160 determines whether a power saving mode is set in the current mobile terminal. As the determination, when the power saving mode is set, the control unit 160 controls the environmental value measuring unit 145 to measure an environmental value.

The control unit 160 compares the luminous intensity and the intensity of received frequencies which are measured by the luminous intensity measuring unit 146 and the RF signal intensity measuring unit 147 of the environmental value measuring unit 145 with critical values stored in the storage unit 140. When the measured environmental values are less than the critical values, the control unit 160 stops the execution of video telephony communication and performs only voice communication.

The operation of stopping the video telephony communication and executing the voice communication includes stopping the operation of the camera module 150, stopping the transmission of the video signal received through the camera module 150 even when the camera module 150 is being operated, and switching a video telephony communication mode to a voice communication mode.

Figure 2B:
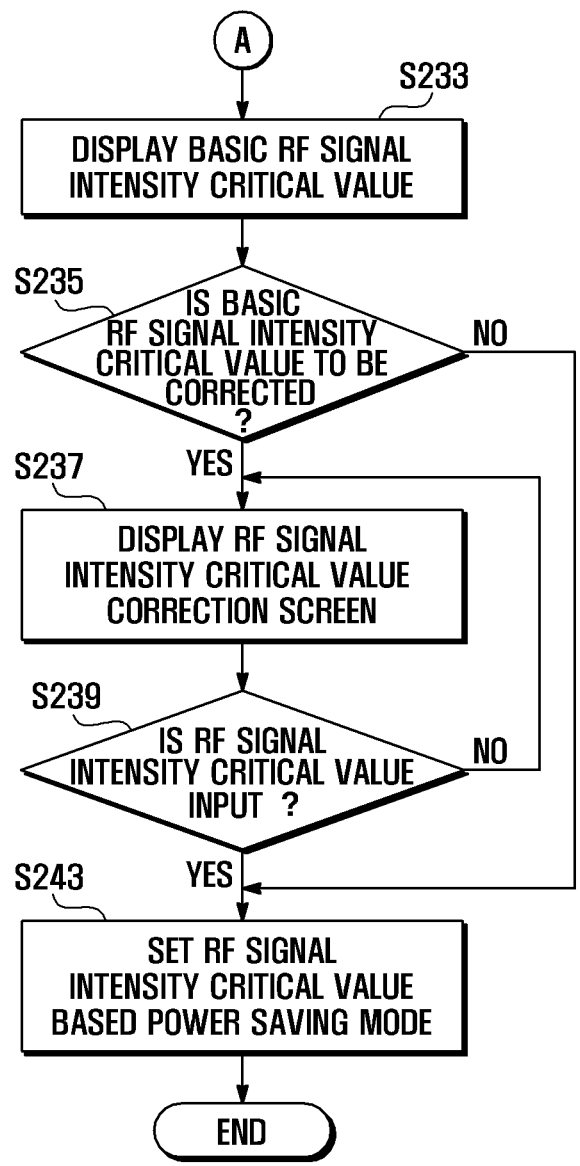

FIGS. 2A and 2B are flowcharts illustrating a process of setting a critical value of a power saving mode in a video telephony communication method of a terminal according to an exemplary embodiment of the present invention.

Referring to FIGS. 1, 2A and 2B, when a request signal for setting a power saving mode is received from the input unit 130 it in step S201, the control unit 160 controls the display unit 135 to display a screen for setting the power saving mode in step S203.

Thereafter, the control unit 160 determines whether a signal for selecting the power saving mode that is to be set in the terminal is received from the input unit 130 in step S205. When the signal for selecting the power saving mode is determined to be input in step S205, the control unit 160 confirms the power saving mode corresponding to the signal for selecting the power saving mode in step S207.

When a luminous intensity saving mode is confirmed to be selected in step S207, the control unit 160 controls the display unit 135 to display a basic luminous intensity critical value in step S209. The basic luminous intensity critical value may be a luminous intensity critical value set during the manufacturing of a terminal or may be preset by a user.

Then, the control unit 160 determines whether a request signal for a correction of the basic luminous intensity critical value is received in step S211. If the request signal for correction of the basic luminous intensity critical value is determined not to be received in step S211, the control unit 160 in step 219 sets the luminous intensity based power saving mode in the terminal using the basic luminous intensity critical value displayed in step S209. On the other hand, if the request signal for correction of the basic luminous intensity critical value is determined to be received in step S211, the control unit 160 controls the display unit 135 to display a screen for correction of the luminous intensity critical value in step S213.

The control part 160 determines whether a luminous intensity critical value is input through the input unit 130 by a user in step S215. If the luminous intensity critical value is determined not to be input in step S215, the control unit 160 returns to step S213 and displays a screen for the correction the luminous intensity critical value. If the luminous intensity critical value is determined to be input in step S215, the control unit 160 in step S219 sets the luminous intensity based power saving mode in the terminal using the luminous intensity critical value received in step S215.

On the other hand, if both the luminous intensity based power saving mode and the RF power saving mode are confirmed to be selected in step S207, the control unit 160 controls the display unit 135 to display the basic luminous intensity and basic RF signal intensity critical values in step S221. The basic luminous intensity and RF signal intensity critical values may be set during the manufacturing of a terminal or may be preset by a user.

Then, the control unit 160 determines whether a request signal for correction of the displayed basic luminous intensity and RF signal intensity critical values are input in step S223. If the request signal for correction of the basic luminous intensity and RF signal intensity critical values are determined not to be input in step S223, the control unit 160 sets a luminous intensity and RF signal intensity based power saving mode in the terminal using the basic luminous intensity and RF signal intensity critical values in step S231. If the request signal for correction of the basic luminous intensity and RF signal intensity critical values are determined to be input in step S223, the control unit 160 controls the display unit 135 to display a screen for the correction of the basic luminous intensity and RF signal intensity critical values in step S225.

The control unit 160 determines whether luminous intensity and RF signal intensity critical values are input through the input unit 130 by a user in step S227. If the luminous intensity and RF signal intensity critical values are determined not to be input in step S227, the control unit 160 returns to step S225 and displays a screen for correction of the luminous intensity and RF signal intensity critical values. If luminous intensity and RF signal intensity critical values are determined to be input in step S227, the control unit 160 in step S231 sets a luminous intensity and RF signal intensity based power saving mode according to the luminous intensity and RF signal intensity critical values received in step S227.

On the other hand, if an RF signal intensity based mode is confirmed to be selected in step S207, the control unit 160 controls the display unit 135 to display a basic RF signal intensity critical value in step S233. The basic RF signal intensity critical value may include an RF signal intensity critical value set during the manufacturing of a terminal or may be preset by a user.

Then, the control unit 160 determines whether a request signal for correction of the displayed basic RF signal intensity critical value is input in step S235. If the request signal for correction of the basic RF signal intensity critical value is determined not to be input in step S235, the control unit 160 in step S243 sets the RF signal intensity based power saving mode in the terminal according to the basic RF signal intensity critical value displayed in step S233. On the other hand, if the request signal for correction of the basic RF signal intensity critical value is determined to be input in step S235, the control unit 160 controls the display unit 135 to display a screen for correction of the RF signal intensity critical value in step S237.

Then, the control unit 160 determines whether an RF signal intensity critical value is input through the input unit 130 by a user in step S239. If the RF signal intensity critical value is determined not to input in step S239, the control unit 160 returns to step S237 and displays the screen for correction of the RF signal intensity critical value. On the other hand, if the RF signal intensity critical value is determined to be input in step S239, the control unit 160 sets the RF signal intensity based power saving mode in the terminal according to the RF signal intensity critical value input in step S243.

Figure 3A:
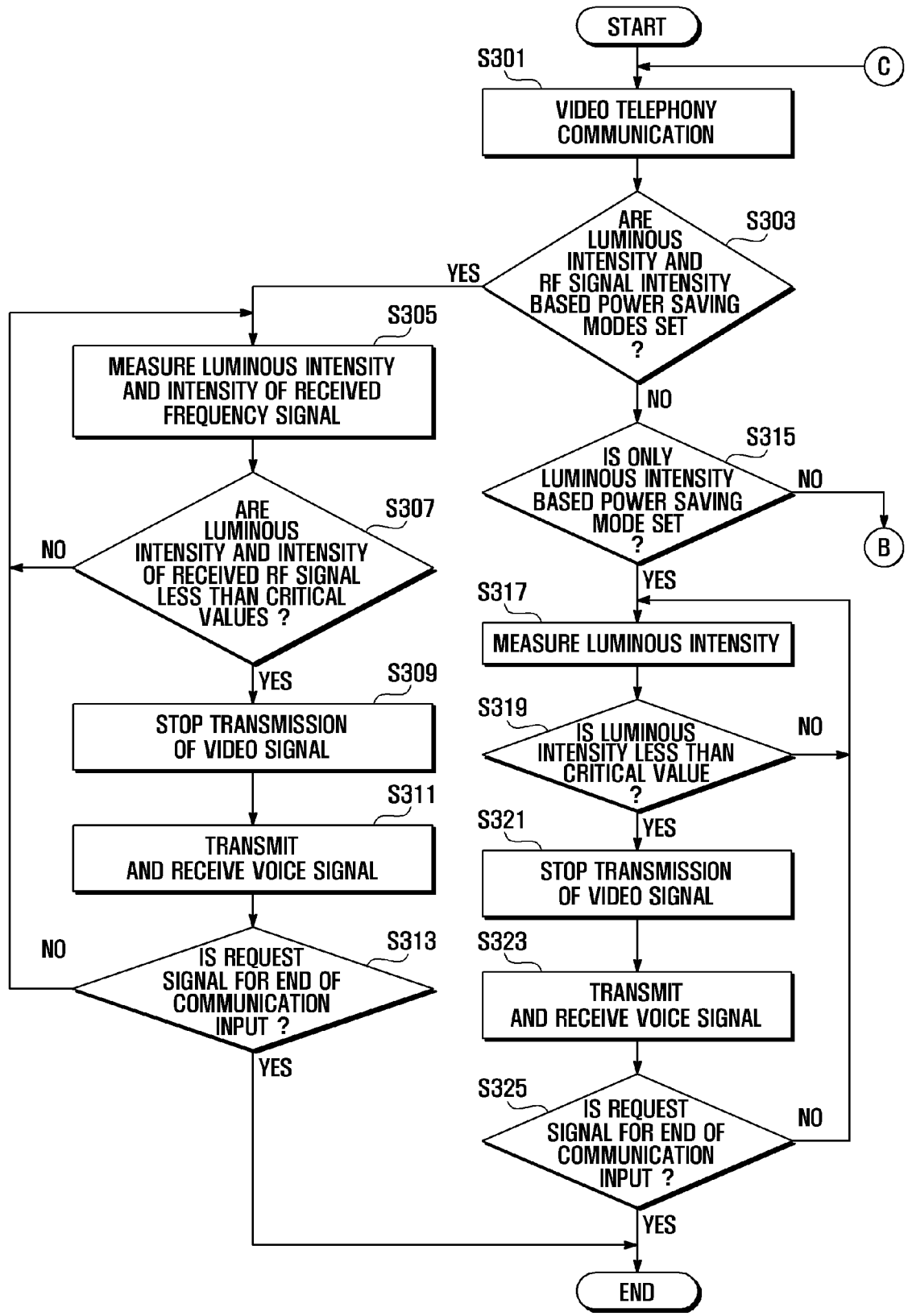
FIGS. 3A and 3B are flowcharts illustrating a method for video telephony communication using a terminal according to another exemplary embodiment of the present invention.
Figure 3B:
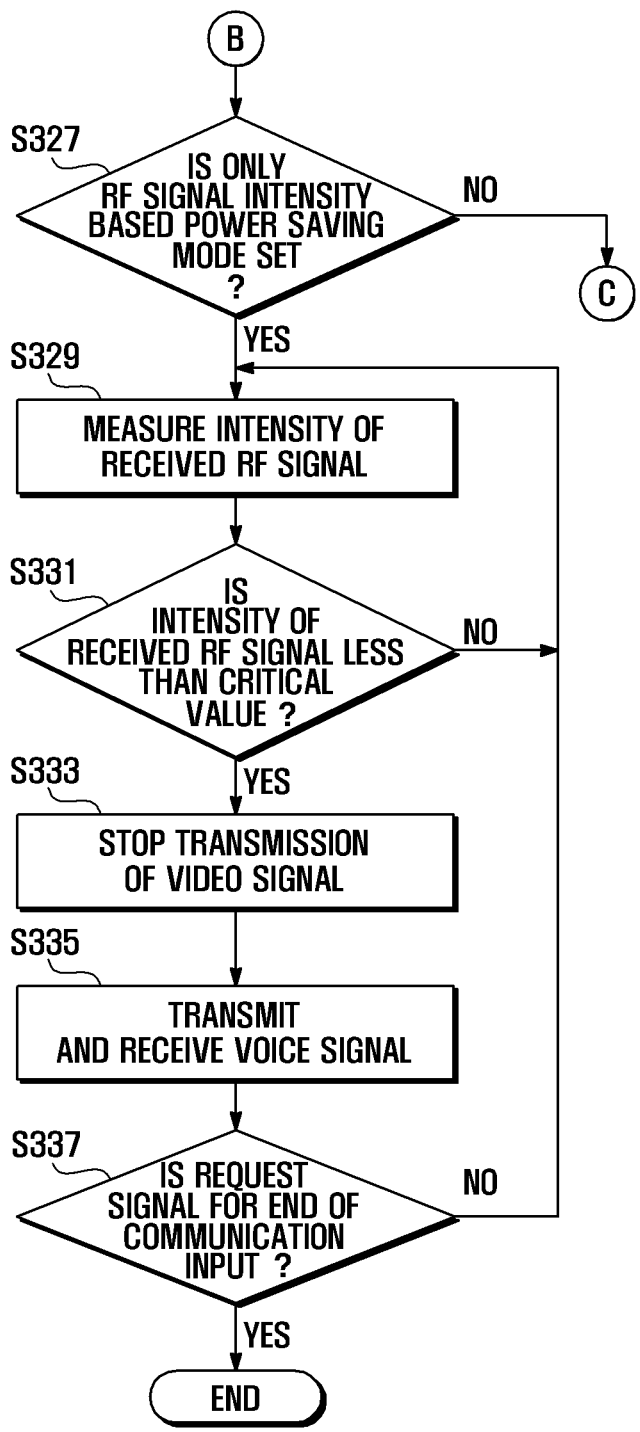

FIGS. 3A and 3B are flowcharts illustrating a method for video telephony communication using a terminal according to another exemplary embodiment of the present invention.

Referring to FIGS. 1, 3A and 3B, the control part unit of the terminal executes video telephony communication for transmitting and receiving video and voice signals in step S301. The control part unit of the terminal then determines whether a luminous intensity based power saving mode and an RF based power saving mode are set in the current terminal in step S303.

A luminous intensity based power saving mode refers to a mode in which the luminous intensity of a video signal received by a terminal through the camera module 150 is measured using the luminous intensity measuring unit 146 during video telephony communication, and the video telephony communication is stopped and only voice communication is performed when the measured luminous intensity is equal to or less than a critical value.

An RF based power saving mode refers to a mode in which the intensity of an RF signal received by a terminal using the RF signal intensity measuring unit 147 during video telephony communication, and the video telephony communication is stopped and only voice communication is performed when the measured intensity of the RF signal is equal to or less than a critical value. A mode in which video telephony communication is stopped and only voice communication is performed includes stopping the operation of the camera module 150, not transmitting an image photographed through the camera module 150 even when the camera module is in operation, and converting a video telephony communication mode into a voice communication mode.

If the luminous intensity based power saving mode and the RF signal intensity based power saving mode are determined to be set in step S303, the control unit 160 controls the luminous intensity measuring unit 146 and the RF signal intensity measuring unit 147 to measure the luminous intensity and the intensity of a received RF signal in step S305.

Then, the control unit 160 determines whether the luminous intensity and the intensity of the received RF signal are less than critical values in step S307.

If the measured luminous intensity and the measured intensity of the received RF signal are determined to be equal to or more than the critical values in step S307, the control unit 160 returns to step S305 in order to repeat the previous steps while continuing video telephony communication.

Returning to step S307, if the luminous intensity and the intensity of the received RF signal are determined to be less than the critical values in step S307, the control unit 160 stops the executed video telephony communication in step S309. Then, the control unit 160 transmits and receives only a voice signal through the communication unit 110 to and from a counterpart terminal in step S311.

Stopping of video telephony communication and the transmission and reception of voice signals are implemented by stopping a currently executed video telephony communication mode and converting the video telephony communication mode into a voice communication mode.

The transmission and reception of voice signals are implemented by stopping transmission of images captured through the camera module 150 and used in video telephony communication with a counterpart terminal. In this case, when only a voice signal is transmitted and received in an environment of low luminous intensity and weak electric field, it is preferable to cut off power supplied to the camera module 150 or the display unit 135 in order to reduce power consumption. In a state of low luminous intensity, a preset substitutive video file (multimedia data such as a still image or a moving image) may be transmitted instead of videos photographed through the camera module 150.

Then, the control unit 160 determines whether a request signal for finishing voice communication is received from the input unit 130 in step S313. When a request signal is determined not to be received in step S313, the control unit 160 returns to step S305 and measures the luminous intensity and the intensity of a received RF signal. Then, the control unit 160 determines whether the measured luminous intensity and the measured intensity of the received RF signal are less than critical values in step S307. If the measured luminous intensity and the measured intensity of the received RF signal are determined to be equal to or more than the critical values in step S307, the control unit 160 resumes the stopped operation of the camera module 150 in the step S309, and returns to the step S301 to perform video telephony communication. Then, the control unit 160 repeats the previous steps.

Returning to step S303, if the luminous intensity based power saving mode and the RF signal intensity based power saving mode are determined not to be set, the control unit 160 determines whether only the luminous intensity based power saving mode is set in step S315.

If only the luminous intensity based power saving mode is determined to be set in step S315, the control unit 160 measures the luminous intensity by controlling the luminous intensity measuring unit 146 in step S317.

Further, the control unit 160 determines whether the measured luminous intensity is less than a critical value in step S319. If the measured luminous intensity is determined to be more than the critical value in step S319, the control unit 160 returns to the step S317 and repeats the previous steps, continuing voice telephony communication. On the other hand, if the measured luminous intensity is determined to be less than the critical value in step S319, the control unit 160 stops video telephony communication in step S321 and transmits and receives a voice signal. Then, the control unit 160 transmits and receives only a voice signal to and from a counterpart terminal through the communication unit 110 in step S323.

Stopping of video telephony communication and transmission and reception of voice signals are implemented by stopping a currently executed video telephony communication mode and converting the video telephony communication mode into a voice communication mode.

The transmission and reception of voice signals are implemented by stopping transmission of videos photographed through the camera module 150 and used in video telephony communication with a counterpart terminal. When only a voice signal is transmitted and received in an environment of low luminous intensity and weak electric field, it is preferable to cut off power supplied to the camera module 150 or the display unit 135 in order to reduce power consumption. In a state of low luminous intensity, a preset substitutive video file (multimedia data such as a still image or a moving image) may be transmitted instead of videos photographed through the camera module 150.

Then, the control unit 160 determines whether a request signal for finishing voice telephony communication is received from the input unit 130 in step S325. When a request signal is determined not to be received in step S325, the control unit 160 returns to step S317 and measures the luminous intensity and the intensity of a received RF signal. Then, the control unit 160 determines whether the measured luminous intensity is less than a critical value in step S319. If the measured luminous intensity is determined to be equal to or more than the critical value in step S319, the control unit 160 resumes the stopped operation of the camera module 150 in the step S321, and continues video telephony communication.

Returning to step S315, if the luminous intensity based power saving mode is determined not to be set, the control unit 160 determines whether only the RF signal intensity based power saving mode is set in step S327.

If the RF signal intensity based power saving mode is determined not to be set in step S327, that is, neither the luminous intensity base mode nor the RF signal intensity based power saving modes are set, the control unit 160 returns to step S301 of executing video telephony communication and repeats the previous steps.

If only the RF signal intensity based power saving mode is determined to be set in step S327, the control unit 160 measures the intensity of an RF signal by controlling the RF signal intensity measuring unit 146 in step S329.

Further, the control unit 160 determines whether the measured intensity of the RF signal is less than a critical value in step S331. If the measured intensity of the RF signal is determined to be more than the critical value in step S331, the control unit 160 returns to the step S329 and repeats the previous steps, continuing video telephony communication. On the other hand, if the measured intensity of the RF signal is determined to be less than the critical value, the control unit 160 stops the executed video telephony communication in step S333. Then, the control unit 160 transmits and receives only a voice signal to and from a counterpart terminal through the communication unit 110 in step S335.

Stopping of video telephony communication and transmission and reception of voice signals are implemented by stopping a currently executed video telephony communication mode and converting the video telephony communication mode into a voice communication mode.

The transmission and reception of voice signals are implemented by stopping transmission of videos photographed through the camera module 150 and used in video telephony communication with a counterpart terminal. When only a voice signal is transmitted and received in an environment of low luminous intensity and weak electric field, it is preferable to cut off power supplied to the camera module 150 or the display unit 135 in order to reduce power consumption.

Then, the control unit 160 determines whether a request signal for finishing voice telephony communication is received from the input unit 130 in step S337. When a request signal is determined not to be received in step S337, the control unit 160 returns to step S329 and measures the intensity of a received RF signal. Then, the control unit 160 determines whether the measured intensity of the RF signal is less than a critical value in step S331. If the measured intensity of the RF signal is determined to be equal to or more than the critical value in step S331, the control unit 160 resumes the stopped operation of the camera module 150 in the step S333, and continues video telephony communication.

Although exemplary embodiments of the present invention in which transmission and reception of video signals are stopped and only a voice signal is transmitted and received when a measured environmental value is less than a critical value have been described, it should be noted that the present invention includes exemplary embodiments in which either a video signal or a voice signal is transmitted and received to and from a counterpart terminal by a selection of a user.

As discussed above, according to an exemplary embodiment of the present invention, it is possible to avoid unnecessary power consumption that may occur in an environment causing poor video telephony communication.

Furthermore, according to an exemplary embodiment of the present invention, it is possible to avoid unnecessary power consumption by stopping video telephony communication and performing only voice communication in an environment in which luminous intensity and reception rate of radio waves are poor.

While the invention has been shown and described with reference to certain exemplary embodiments thereof, it will be understood by those skilled in the art that various changes in form and details may be made therein without departing from the spirit and scope of the present invention as defined in the appended claims and their equivalents.

What is claimed is:

1. A method for video telephony communication using a terminal in which a power saving mode is set, the method comprising:
   executing video telephony communication for transmitting and receiving video signals and voice signals;
   determining a power saving mode set in the terminal;
   measuring at least one environmental value corresponding to the determined power saving mode, the at least one environmental value comprising an intensity of a received Radio Frequency (RF) signal; and
   stopping transmission of the video signals when the at least one environmental value is less than a predetermined value, the predetermined value being correctable and being displayed on a screen,
   wherein in the determining of the power saving mode, the power saving mode is determined to be one of a plurality of power saving modes comprising a luminous intensity based power saving mode, a luminous intensity and RF signal intensity based power saving mode, and an RF signal intensity based power saving mode, and
   wherein in an environment of a weak electric field, power supplied to a camera module or a display unit is cut off.

2. The method of claim 1, wherein the at least one environmental value further includes a luminous intensity.

3. The method of claim 1, further comprising continuing, when the at least one environmental value is less than the predetermined value, the transmission of the voice signal,
   wherein the video signal comprises images captured from a camera.

4. The method of claim 3, further comprising transmitting a substitute video signal, the substitute video signal comprising images stored in a storage unit, when stopping the transmission of the video signal.

5. The method of claim 3, further comprising deactivating the camera, when stopping the transmission of the video signal.

6. A terminal comprising:
   a communication unit for transmitting and receiving voice signals and video signals, the voice signals and video signals being communicated to and from a counterpart terminal;
   a camera module for capturing images for the video signal to be communicated to the counterpart terminal;
   a display unit for displaying at least one of the video signal received from the counterpart terminal and the video signal to be communicated to the counterpart terminal;

an environmental value measuring unit measuring at least one environmental value, the at least one environmental value comprising a signal intensity of a received Radio Frequency (RF) signal; and a control unit for setting a power saving mode and stopping transmission of the video signals when the at least one environmental value measured by the environmental value measuring unit is less than a predetermined value, the predetermined value being correctable and being displayed on a screen, wherein in an environment of a weak electric field, power supplied to a camera module or a display unit is cut off, and wherein the power saving mode is selected from a plurality of power saving modes comprising a luminous intensity based power saving mode, a luminous intensity and RF signal intensity based power saving mode, and an RF signal intensity based power saving mode.

7. The terminal of claim 6, wherein the environmental value measuring unit includes at least one of a luminous intensity measuring unit for measuring a luminous intensity and an RF signal intensity measuring unit for measuring the intensity of the received RF signal.

8. The terminal of claim 7, wherein the luminous intensity measuring unit measures a luminous intensity of the images captured through the camera module.

9. The terminal of claim 7, wherein the RF signal intensity measuring unit measures the intensity of the RF signal received through the communication unit.

10. The terminal of claim 6, wherein the control unit controls to continue transmitting and receiving the voice signals when the at least one environmental value measured by the environmental value measuring unit is less than the predetermined value, and stops the transmission of the video signal comprising the images captured by the camera.

11. The terminal of claim 10, wherein the control unit transmits a substitute video signal comprising images stored in a storage unit, when stopping the transmission of the video signal comprising the images captured by the camera.

12. The terminal of claim 6, wherein the control unit, when transmitting and receiving the voice signals when the at least one environmental value measured by the environmental value measuring unit is less than the predetermined value, deactivates the camera.

* * * * *